US012698669B2

(12) United States Patent
Abrahamsson et al.

(10) Patent No.: US 12,698,669 B2
(45) **Date of Patent: *Aug. 4, 2026**

(54) DOOR OPERATOR SYSTEM

(71) Applicant: Assa Abloy Entrance Systems AB, Landskrona (SE)

(72) Inventors: Magnus Abrahamsson, Loddekopinge (SE); Anton Hansson, Kivik (SE); Daniel Eliasson, Lund (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 461 days.

This patent is subject to a terminal disclaimer.

(21) Appl. No.: 17/615,745

(22) PCT Filed: May 27, 2020

(86) PCT No.: PCT/EP2020/064661
§ 371 (c)(1),
(2) Date: Dec. 1, 2021

(87) PCT Pub. No.: WO2020/249395
PCT Pub. Date: Dec. 17, 2020

(65) Prior Publication Data

US 2022/0243518 A1 Aug. 4, 2022

(30) Foreign Application Priority Data

Jun. 10, 2019 (SE) .................................... 1930182-9

(51) Int. Cl.
*E05F 15/684* (2015.01)
*E05F 15/67* (2015.01)

(52) U.S. Cl.
CPC ............ *E05F 15/684* (2015.01); *E05F 15/67* (2015.01); *E05Y 2201/656* (2013.01);
(Continued)

(58) Field of Classification Search
CPC ....... E05F 15/67; E05F 15/684; E05F 15/668; E05F 15/681; E05F 15/643; E05F 15/646; E05F 15/665; E05F 15/619
(Continued)

(56) References Cited

U.S. PATENT DOCUMENTS

| | | | |
|---|---|---|---|
| 1,916,651 | A | 7/1933 | Beeman |
| 1,972,695 | A | 9/1934 | Staude |

(Continued)

FOREIGN PATENT DOCUMENTS

| | | |
|---|---|---|
| CN | 208010220 | 10/2018 |
| DE | 10349904 | 10/2004 |

(Continued)

OTHER PUBLICATIONS

International Search Report and Written Opinion in PCT/EP2020/064661 mailed Sep. 2, 2020.

(Continued)

*Primary Examiner* — Abe Massad
*Assistant Examiner* — Matthew R. Shepherd
(74) *Attorney, Agent, or Firm* — Wissing Miller LLP

(57) ABSTRACT

An overhead door operator system (1) for opening and closing an opening (2), comprising a door frame (3) comprising a first frame section (4) at a first side (5) of the opening (2) and a second frame section (6) at a second side (7) of the opening (2). The operator system further comprises a door (8) arranged to be moved between an open and closed (C) position, the door (8) being movably connected to the door frame (3) and a drive unit (10) mounted on the door (8), the drive unit (10) comprising at least one motor (11) arranged to move the door (8) from the closed position (C) to the open position (O). An elongated transmission member (19) extends along the first side (5) of the opening (2) and the first frame section (4). The drive unit (10) further
(Continued)

comprises a driven transmission member (18) in driving connection with the motor (11).

22 Claims, 7 Drawing Sheets

(52) U.S. Cl.
CPC ....... *E05Y 2400/41* (2013.01); *E05Y 2600/46* (2013.01); *E05Y 2900/106* (2013.01)

(58) Field of Classification Search
USPC ........................... 49/199, 200, 324, 325, 360
See application file for complete search history.

(56) References Cited

U.S. PATENT DOCUMENTS

| | | | | | |
|---|---|---|---|---|---|
| 1,981,026 | A | | 11/1934 | Cady | |
| 2,676,294 | A | | 4/1954 | Wilcox | |
| 2,755,081 | A | * | 7/1956 | Johnson | E05F 15/67 188/77 R |
| 3,336,968 | A | * | 8/1967 | Curtis | E05F 15/67 160/188 |
| 3,775,906 | A | * | 12/1973 | Dougherty | E05F 15/635 49/427 |
| 4,732,203 | A | | 3/1988 | Alten | |
| 4,984,387 | A | | 1/1991 | Wheatland | |
| 6,059,005 | A | * | 5/2000 | Zinbarg | E06B 3/7001 160/90 |
| 7,048,029 | B2 | * | 5/2006 | Rieder | E05F 15/676 49/358 |
| 7,372,225 | B2 | * | 5/2008 | Murphy | E05F 15/686 318/445 |
| 11,761,250 | B2 | * | 9/2023 | Balder | E05D 15/248 160/188 |
| 2004/0177934 | A1 | | 9/2004 | Olmstead | |
| 2004/0182528 | A1 | | 9/2004 | Rieder | |
| 2012/0066976 | A1 | * | 3/2012 | Murray | E05F 15/643 49/358 |
| 2012/0198773 | A1 | * | 8/2012 | Younce | E05F 15/635 310/83 |
| 2018/0230732 | A1 | | 8/2018 | Tseng | |
| 2022/0049538 | A1 | * | 2/2022 | Abrahamsson | E05F 15/67 |
| 2022/0216732 | A1 | * | 7/2022 | Abrahamsson | H02J 7/345 |
| 2023/0012351 | A1 | * | 1/2023 | Eliasson | E05F 15/684 |
| 2023/0184022 | A1 | * | 6/2023 | Eliasson | E05F 15/668 49/31 |
| 2023/0220715 | A1 | * | 7/2023 | Abrahamsson | E05F 15/40 49/31 |
| 2023/0265705 | A1 | * | 8/2023 | Eliasson | E05D 15/242 49/199 |

FOREIGN PATENT DOCUMENTS

| | | |
|---|---|---|
| EP | 0222300 | 5/1987 |
| EP | 0523630 | 1/1993 |
| EP | 1431500 | 6/2004 |
| EP | 1496185 | 1/2005 |
| JP | 2004285825 | 10/2004 |
| JP | 2005226350 | 8/2005 |

OTHER PUBLICATIONS

Swedish Search Report in 1930182-9 mailed Jan. 16, 2020.
Chinese Office Action in 202080055675X dated Feb. 8, 2023.
Japanese Office Action in 2021-572608 dated Mar. 27, 2024.
Examination Report in corresponding Indian Application No. 202147056403 mailed Dec. 26, 2025. (6 pages).

* cited by examiner

DOOR OPERATOR SYSTEM

TECHNOLOGY FIELD

The present invention relates to an overhead door operator system for opening and closing an opening.

BACKGROUND

A door operator system for an overhead door typically comprises a door connected to a door frame and a drive unit arranged to move the door along the door frame between an open and closed position for opening and closing the opening. The door, which may be a sectional door, is typically used as a garage doors or as an industrial door. The drive unit can further comprise a motor or a mechanical unit such as a spring to move the door.

In conventional overhead sectional door an electric motor mounted above the door pulls up the door using wires attached to the door. Such an overhead sectional door often implements balancing springs to reduce the force required to open the door. The implementation of a balancing spring increases the complexity of the door and is cumbersome to install when the door is mounted into position.

To achieve a more efficient door operator system that reduces the complexity and the risks of the door operator system during operation, maintenance and installation a door operator system with drive units mounted to the door has been developed. The door is driven by means of driven pinions interfacing with a fixed rack extending along the intended movement trajectory of the door. Such a door addresses several shortcomings and disadvantages with conventional door operator systems by introducing a drive modularity, allows for easier and faster installation and a reduced complexity. Additionally, it does not require a balancing spring.

However, the driving of such a door is associated with a number of challenges. The fixed rack requires a high accuracy in manufacturing and proper aligning of the racks when the door is installed. This increases the cost both for the door itself and the installation of the door.

SUMMARY

An object of the present disclosure is to provide an overhead door operator system which seeks to mitigate, alleviate, or eliminate one or more of the above-identified deficiencies in the art and disadvantages singly or in any combination.

An object of the present invention is to reduce the complexity of the overhead door operator system.

According to one aspect an overhead door operator system for opening and closing an opening is provided. The overhead door operator system comprises a door frame comprising a first frame section at a first side of the opening and a second frame section at a second side of the opening. The overhead door operator system further comprises a door arranged to be moved between an open and closed position, the door being movably connected to the door frame.

Additionally, the operator system comprises a drive unit mounted on the door, the drive unit comprising at least one motor arranged to move the door from the closed position to the open position and an elongated transmission member extending along the first side of the opening and the first frame section.

The drive unit further comprises a driven transmission member in driving connection with the motor, the driven transmission member being movably connected to the elongated transmission member and arranged to interplay with said elongated transmission member for driving the driven transmission member along said elongated transmission member by means of the elongated transmission member at least partially wrapping around the driven transmission member.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

A reference to an entity being "designed for" doing something in this document is intended to mean the same as the entity being "configured for", or "intentionally adapted for" doing this very something.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
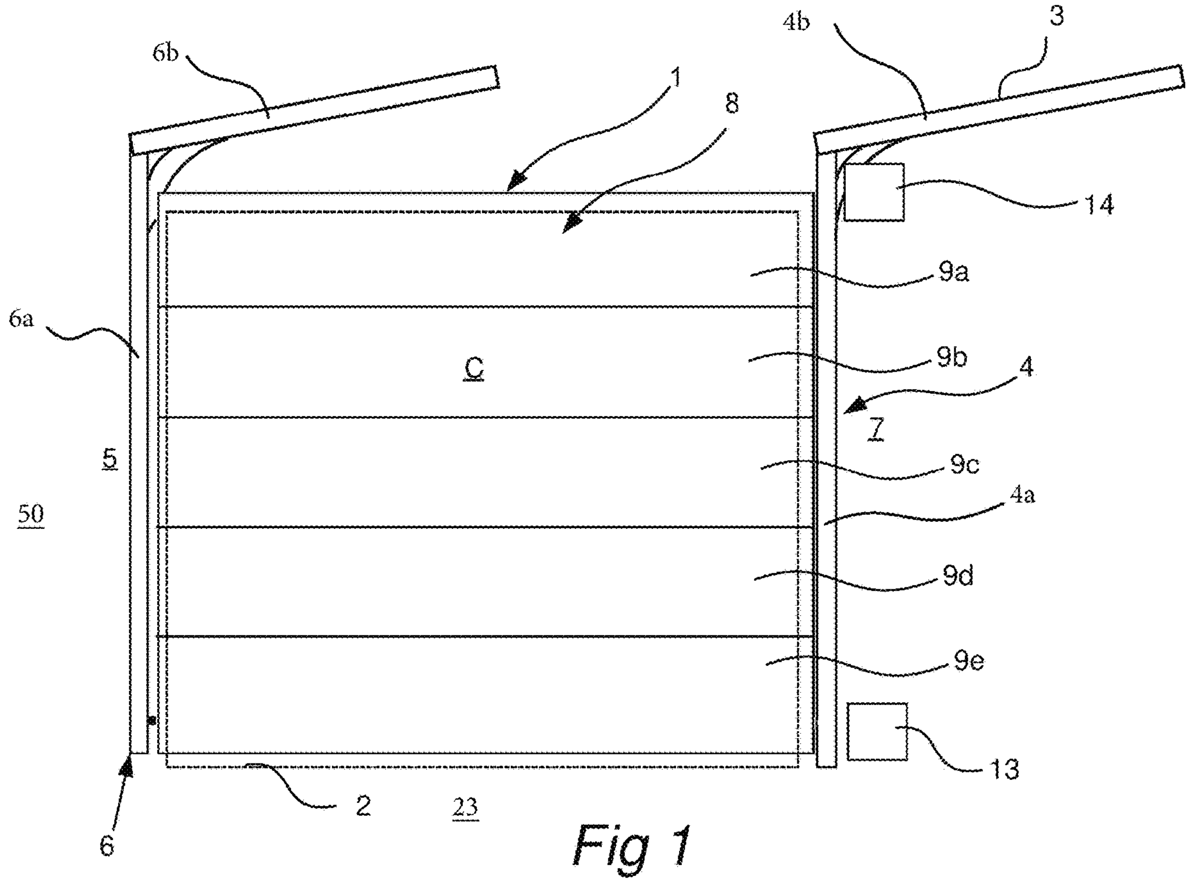
FIG. 1 is a schematic perspective view of a door operator system comprising a door in a closed position.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIGS. 1-4 all illustrates a sectional overhead door operator system. However, as should be understood by a person skilled in the art, the inventive aspects of the present invention are also applicable to a door operator system that is a single blade door operator system.

FIG. 1 is schematic views of a door operator system 1 in which the inventive aspects of the present invention may be applied. The door operator system comprises a door frame 3, a drive unit 10 (shown in FIG. 2a-c) and a door 8. The door operator system 1 is arranged to be installed in an opening 2 defined by a wall and a floor. The door 8 is connected to the door frame 3. The door operator system 1 is arranged to open and close the opening 2 by moving the door 8 between an open position O and a closed position C.

In this embodiment, the door 8 is a sectional door 8 comprising a plurality of horizontal and interconnected sections 9a-e connected to the door frame 3. In one embodiment, the door is a garage door. In an alternative embodiment, the door is an industrial door. The door 8 is arranged to be moved along the door frame 3 between the closed position C and the open position O.

As shown in FIG. 1, the door operator system 1 may comprise a first terminal 13 and a second terminal 14. The at least one terminal 13, 14 is configured to transmit energy for charging an energy storage device, such as a battery, for powering the motor of the drive unit.

In one embodiment, the door operator system is an up and over door operator system. A up and over door operator system is a system in which the door in the closed position C is arranged substantially vertical and in the open position O is arranged substantially horizontal and inside of the opening.

In an alternative embodiment, the door operator system is an up and up door operator system. A up and up door operator system is a system in which the door in the closed position C is arranged substantially vertical and in the open position O is arranged substantially vertical above the opening.

In a further alternative embodiment, the door operator system may be a door operator system in which the door in the closed position C is arranged substantially vertical and in the open position O is arranged in an inclined position disposed between a substantially vertical and a substantially horizontal position. For example, the door may be arranged at a 45 degrees angle from a horizontal position in the open position O, as the skilled person recognizes however the door may be arranged at any angle disposed between the horizontal and vertical orientation of the door in the open position O.

The door frame 3 comprises a first frame section 4 at a first side 5 of the opening 2 and a second frame section 6 at a second side 7 of the opening 2. The door frame 3 is connected to the wall 50 and to the floor 23. In one embodiment, the first frame section 4 comprises a substantially vertical part 4a and a substantially horizontal part 4b. The second frame section 6 comprises a substantially vertical part 6a and a substantially horizontal part 6b. The vertical part 4a, 6a and the horizontal part 4b, 6b are connected to create a path for the door 8 to glide on and a track for the drive unit 10 to interact with. In one embodiment, wherein the door operator system is an up and up door operator system the first and second frame section are vertical.

Referencing FIG. 1, the door 8 is directly or indirectly connected to the door frame 3. The door 8 is at a first side moveably connected to the first frame section 4 and at a second side moveably connected to the second frame section 6. In one embodiment, one or more of the plurality of sections 9a-e is connected to the first frame section 4 at said first side 5 and to the second frame section 6 at said second side 7.

With reference to FIG. 2a-e, the drive unit 10 is mounted on the door 8. The drive unit 10 comprises at least one motor 11. The at least one motor 11 is arranged to move the door 8 from the closed position C to the open position O.

To allow for the driving of the door 8, the overhead door operator system 1 further comprises an elongated transmission member 19 extending along the first side 5 of the opening 2 and the first frame section 4. The drive unit 10 further comprises a driven transmission member 18 which is in driving connection with the motor 11. The driven transmission member 18 is movably connected to the elongated transmission member 19 and arranged to interplay with said elongated transmission member 19 for driving the driven transmission member 18 along said elongated transmission member 19 by means of the elongated transmission member 19 at least partially wrapping around the driven transmission member 18. Thus, the elongated transmission member 19 is arranged to at least partially envelope said driven transmission member 18.

The elongated transmission member does in comparison with a fixed rack provide a more cost-efficient solution both in terms of manufacturing and installation. Furthermore, the elongated transmission member allows for relative movement between the door 8 and the frame and does not require a high accuracy and proper aligning in the same manner as a fixed rack solution. The elongated transmission member may thus be arranged to allow for a degree of movement along a direction orthogonal to the first frame section 4.

Further, the elongated transmission member enables a safer door operator system due to said elongated transmission member following and keeping the engagement with the driven transmission member, at least to some extent, even if the door is pushed away from the rail. In addition, the elongated transmission member is more silent and resistant to wear compared to a fix rack and less likely to malfunction due to pinching of external objects.

The elongated transmission member 19 may be in the form of a suspended bendable transmission member. It is noted that bendable in this context does not necessarily imply that said transmission member necessarily is flexible but only that it allows for wrapping around the driven transmission member. Accordingly, the transmission member 19 may be considered to be arranged to be in engagement with the driven transmission member 18 and provide for relative movement between the driven transmission member 18 and a direction of movement of the door 8 as defined by the frame 3. Worded differently said transmission member may be considered as a non-fix transmission member or a suspended transmission member. The elongated transmission member may accordingly be arranged to engage the driven transmission member independently of the frame.

The drive unit 10 is moveably connected to the elongated transmission member 19. Accordingly, drive unit 10 is connected to said elongated transmission member 19 so as to allow for relative movement between the door and the frame, whereby the drive unit is fix to the door. The drive unit 10 comprises at least one motor 11. The drive unit 10 is arranged to move the door 8 from the closed position to the open position. To provide power to the motor 11, the at least one motor 11 may be connected to at least one energy storage device, such as a battery, arranged to power the at least one motor 11. The drive unit 10 is arranged to move the door 8 from the closed position C to the open position O.

In one embodiment, the drive unit 10 is arranged to move the door from the open position O to the closed position C. In one embodiment, the door 8 is arranged to move from the open position O to the closed position C by means of the weight of the door 8. In one embodiment, the drive unit 10 is arranged to brake the door 8 when moving from the open position O to the closed position C.

In one embodiment, the elongated transmission member may be suspended only by means of a top end and a bottom end.

The elongated transmission member 19 may be biased. The biasing of the elongated transmission member 19 enables keeping of the tension of the resilient elongated member 19 at a suitable level and further compensates for wear and potential tolerance issues.

In one embodiment, the elongated transmission member 19 may be biased by means of a spring arrangement. A top end of the elongated transmission member 19 may be fixedly mounted and a bottom end of said elongated transmission member 19 may be spring-loaded. This allows for easier access for an operator performing service work involving the spring. In one embodiment, the top and bottom end of the elongated transmission member 19 is mounted to the frame, for example the first frame section 4.

In one embodiment, the overhead door operator system further comprises at least one guide member 92. The at least one guide member 92 is mounted to the door 8. The guide member 92 may be arranged to interplay with the elongated transmission member 19 for guiding the door 8 along the elongated transmission member 19 by means of the elongated transmission member 19 at least partially wrapping around the at least one guide member 92. The guide member 92 thus moves the elongated transmission member 19 and guides the driven transmission member 18 in relation to said elongated transmission member 19 to properly align them. Hence, a more reliable door operator system may be achieved. The guide member 92 may preferably be a rotatable guide member which may be mounted to the door 8 by means of a journaled connection. Thus, the elongated transmission member 19 is arranged to at least partially envelope said guide member 92.

Referencing FIG. 2*a-e*, the elongated transmission member 19 may be arranged to wrap around and interplay with a portion of the driven transmission member 18 and a portion of the guide member 92. The portion of the driven transmission member 18 interplaying with the elongated transmission member 19 being opposite to the portion of the guide member 92 interplaying with said elongated transmission member 19. This achieves a larger interface between the driven transmission member, guide member and elongated transmission member, whereby a more stable overhead door operator system which requires less torque to operate may be achieved.

As shown in FIG. 2*a-e*, the elongated transmission member 19 is preferably suspended along the first side of the opening.

The elongated transmission member 19 may be any conventional elongated transmission member 19 providing the required slack to compensate for horizontal or diagonal movement of the drive unit and/or door. The elongated transmission member may be a belt or a chain.

In one embodiment, the elongated transmission member 19 may be a belt. Thus, the guide member 92 and the driven transmission member 18 may be pulley elements arranged to interface with said belt. In one embodiment, the belt may be a cogged belt or a ribbed belt, whereby the guide member 92 and the driven transmission member 18 may be cogged wheels interfacing with the ribs of said cogged or ribbed belt.

Figure 2A:
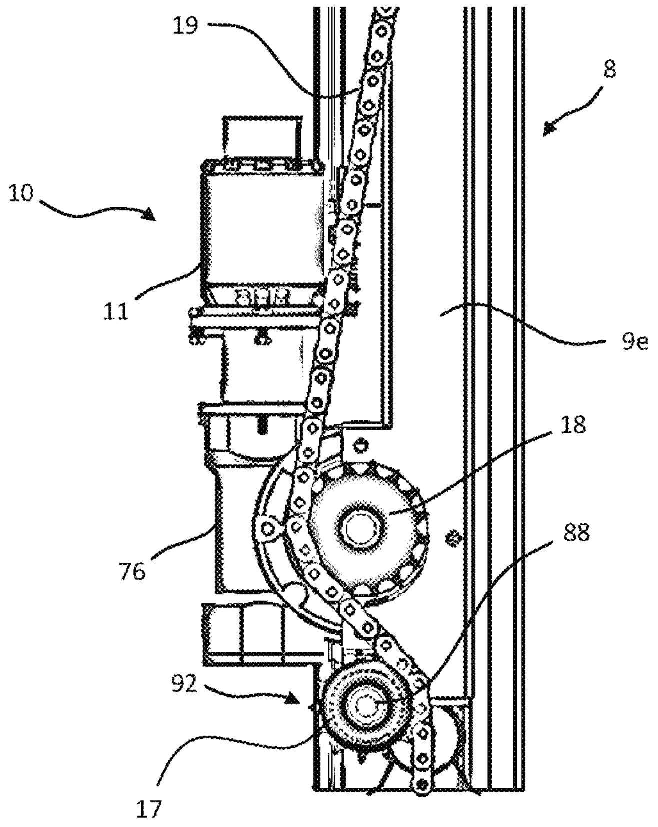
FIG. 2*a* is a schematic perspective view of a drive unit according to an embodiment.
Figure 2B:
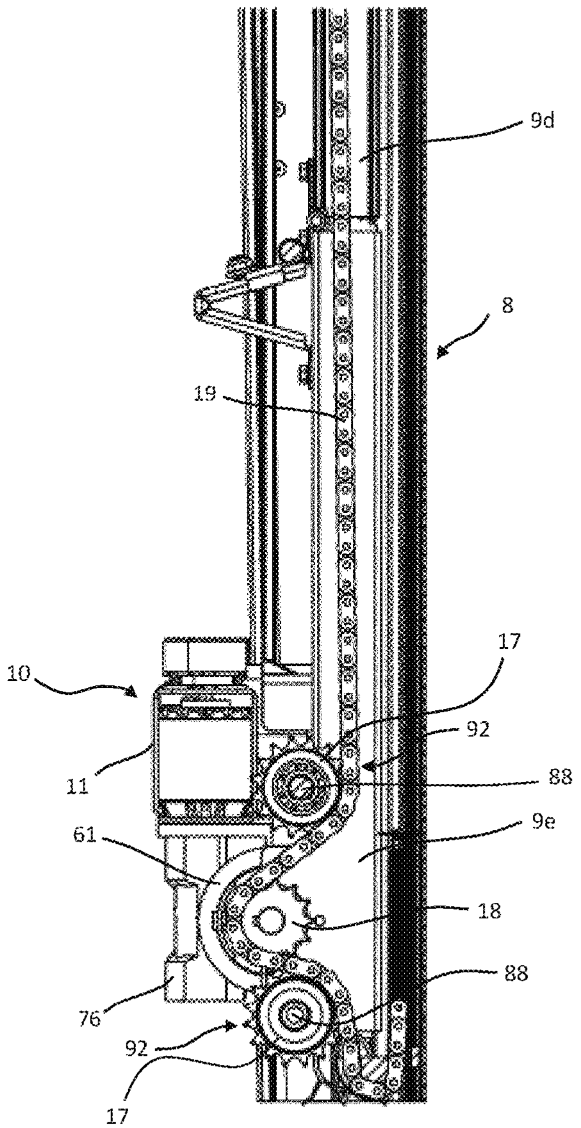
FIG. 2*b* is a schematic perspective view of a drive unit according to an embodiment.
Figure 2C:
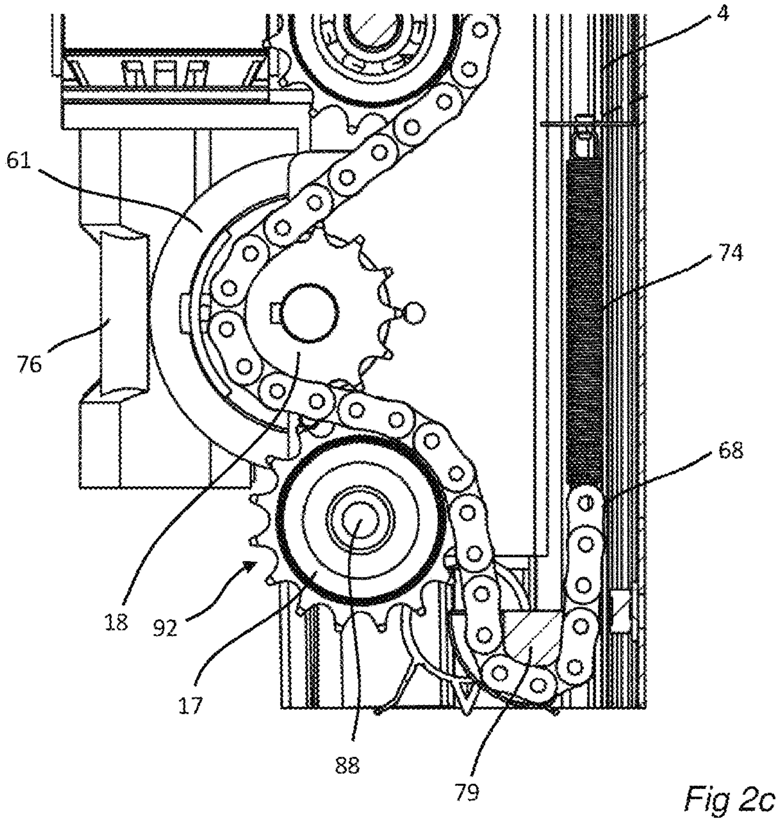
FIG. 2*c* is a schematic perspective view of a drive unit according to an embodiment.

The elongated transmission member 19 may also be a chain, which is depicted in FIG. 2*a-c*. The chain may be provided with slots for receiving cogs. Accordingly, the driven transmission member 18 may be a cogged wheel arranged to interplay with the chain, e.g. the slots of the chain. The driven transmission member 18 may be a sprocket. Further, the guide member 92 may be a cogged wheel arranged to interplay with the chain, e.g. the slots of the chain. The guide member 92 may be a sprocket. In one embodiment, the guide member 92 may be a ribbed wheel for interplaying with the chain. In one embodiment, the chain is an endless chain enveloping the guide member(s) and the driven transmission member(s). In one embodiment, the chain is a non-endless chain, e.g. a single chain only partially enveloping the guide member(s) and the driven transmission member(s).

In one embodiment, the overhead door operator system further comprises a first set of guide rollers 17 and a second set of guide rollers 17. Said first and second set of guide rollers are mounted to the door 8. The first set of guide rollers 17 are arranged to interplay with the first frame section 4 and the second set of guide rollers 17 are arranged to interplay with the second frame section 6. The guide rollers thus moves together with the door 8 in a guided manner along the trajectory formed by the frame, e.g. the first frame section 4 and the second frame section 6.

In one embodiment, the door 8 is a sectional door. Hence, the door comprises a plurality of horizontal and interconnected sections 9*a-e* (as depicted in FIG. 1).

Again referring to FIG. 2*a-c*, the drive unit 10 is mounted on a section 9*e* of the door 8. To make the movement of the section smoother, the section onto which the drive unit 10 is mounted is provided with two pairs of guide rollers. A first and second upper guide roller accordingly extend from the section 9*e* towards the first frame section 4 and the second frame section 6, respectively. Similarly, a first and second lower guide roller extend from the section 9*e* towards the first frame section and the second frame section 6, respectively.

In one embodiment, the drive unit 10 is mounted to the bottommost section 9*e* of the door 8 and the first and second lower guide roller are disposed adjacent to a bottom horizontal end phase of the bottommost section 9*e*. The upper guide rollers may correspondingly be disposed adjacent to a top horizontal end phase of the bottommost section 9*e*.

In one embodiment, upper and lower guide rollers may be mounted to each section 9*a-e*. Preferably, the upper guide rollers are disposed adjacent to the upper horizontal end phase and the lower guide rollers are disposed adjacent to the bottom horizontal end phase of each section. The at least one guide member 92 may be, as most clearly depicted in FIG. 2*d*, arranged coaxially with one of the guide rollers 17. The coaxial arrangement reduces the force on the guide member due to the frame and guide roller taking up some of the load during the movement of the door. Hence, resulting forces to the door sections and bearings of the drive unit and/or guide member are reduced. Furthermore the coaxial arrangement allows for more of the elongated transmission member to be disposed behind the guide rollers which decreases the exposure of said elongated transmission member. The guide roller 17 is mounted to the door 8 by means of a shaft 88. Both the guide roller 17 and the guide member 92 are mounted to the shaft. The guide member 92 may be fixedly attached to the shaft 88. Advantageously, the guide roller 17 and the guide member 92 may be arranged adjacent to the bottom horizontal edge of the door 8. In one embodiment, the guide member is integrated into the guide roller.

As seen in said FIG. 2*a-d* coaxial herein implies that the guide roller and the guide member are arranged parallel to each other along a horizontal axis extending. The horizontal axis extends between the first and second frame section.

In one embodiment, the guide member is coaxial with the guide roller being disposed adjacent to a bottom horizontal end phase of the bottommost section 9*e* of the door. This is particularly advantageous due to it providing a superior pivoting position of the door. The guide roller and the guide element hence creates a common low pivot point for the door when the door is approaching its open position O when the overhead door operator system is an up and over door operator system. This significantly reduces the space required above the door opening compared to for example a door with driven sections utilising for example a fix rack.

In one embodiment, a first upper guide member 92 is arranged coaxially with the first upper guide roller 17. Correspondingly, a first lower guide member 92 is arranged coaxially with the first lower guide roller 17. Hence, the section 9*e* which is driven may be both guided along the elongated transmission member 17 and the frame at the same axes. This further increases the stability and decreases the load on the section onto which the drive unit 10 is mounted. Preferably, the section is the bottommost section and the lower guide member and the lower guide wheel are arranged adjacent to the bottom phase of said bottommost section. Hence, one of the guide rollers 17 and one of the guide member 92 may be arranged coaxially to each other adjacent to the bottom horizontal edge of the door 8. This may be the case in a single section door as well.

In one embodiment, the overhead door operator system comprise a pair of elongated transmission members to allow for a more stable movement pattern of the door 8. A first elongated transmission member 19 extends along the first side 5 of the opening 2 and the first frame section 4. A second elongated transmission member 19 extends along the second side 7 of the opening 2 and the second frame section 6. The guiding and driving arrangements discussed with reference to the first side of the door may accordingly be mirrored to the second side of the door.

Thus, the overhead door operator system may further comprise a first and second driven transmission member 18 arranged to interplay with the first and second elongated member 19 by means of the first and second elongated transmission member at least partially wrapping around the first and second driven transmission member, respectively.

The first and second driven transmission member 18 may be driven by means of a single or multiple motors 11. In one embodiment, a single motor 11 is in driving connection with the first and second transmission member 18. The single motor 11 may be connected to the first and second driven transmission members 18 by means of a first and second shaft extending from the motor 11. As will be further described with reference to FIG. 3, the drive unit 10 may comprise a first and a second motor each being in driving connection with the first and second driven transmission member 18, respectively.

Analogously to the first vertical side of the door, the second side of the door may have one or more guide members mounted thereon. In one embodiment, the overhead door operator system further comprises at least one guide member 92 mounted to the door 8 arranged to interplay with the second elongated transmission member for guiding the door 8 along the second elongated transmission member 17 by means of the second elongated transmission member at least partially wrapping around said guide member. Worded differently, said door operator system comprises at least one first guide member 92 mounted on the door 8 arranged to interplay with the first elongated transmission member 19 and at least one second guide member 92 mounted on the door 8 arranged to interplay with the second elongated transmission member 19 by means of the first and second elongated transmission member at least partially wrapping around the first and second guide member, respectively.

Both the elongated transmission members 19 may be biased by means of spring arrangements. A top end of the elongated transmission members 19 may be fixedly mounted and a bottom end of said elongated transmission members 19 may be spring-loaded. This allows for easier access for an operator performing service work involving the spring. In one embodiment, the top and bottom ends of the elongated transmission members 19 are mounted to the frame, .e.g. to the first and second frame section, respectively.

In one embodiment, which is exemplified in FIG. 2*b*, the first driven transmission member 18 may be arranged between a first upper and a lower guide member 92. The first upper and lower guide member 92 are arranged to interplay with the first elongated transmission member 19 by means of the first elongated transmission member at least partially wrapping around the first upper and lower guide member. Similarly, the second driven transmission member 18 may be arranged between a second upper and a lower guide member 92. The second upper and lower guide member 92 are arranged to interplay with the second elongated transmission member by means of the second elongated transmission member at least partially wrapping around the second upper and lower guide member. This enables additional guiding of the elongated transmission member(s) both before and after the driven transmission member(s) in the driving direction without requiring a surplus of components. Hence, a less complex operator assembly may be achieved. Further, this achieves a larger interface between the elongated transmission member and the guiding members over the driven transmission member, resulting in a more stable door operator system which requires less torque to operate. The first and second driven transmission member 18 may thus be arranged to extend from the door 8 in opposite directions towards the first and second elongated transmission member 19, respectively. The first driven transmission member 18 may be arranged proximal to a first vertical phase of the door, said first phase being adjacent to the first elongated transmission member when the door is in the closed position. Similarly, the second driven transmission member 18 may be arranged proximal to a second vertical phase of the door, said second phase being adjacent to the second elongated transmission member when the door is in the closed position.

The elongated transmission members 19 may be arranged to wrap around and interplay with a portion of the driven transmission member 18 and a portion of the upper and lower guide members 92. The portion of the driven transmission member 18 interplaying with the elongated transmission member 19 being opposite to the portions of the upper and lower guide member 92 interplaying with said elongated transmission member 19. This achieves a larger interface between the driven transmission member, guide member and elongated transmission member, whereby a more stable overhead door operator system which requires less torque to operate may be achieved.

In one embodiment, wherein only a first elongated transmission member is in driving connection with the transmission member, the door operator system may only comprise a first upper and lower guide member according to the above.

In one embodiment wherein the drive unit 10 is mounted to a section 9*e* of the door 8, a first upper guide member 92 arranged to interplay with the first elongated transmission member 19 may be arranged adjacent to a top phase of the section 9*e*. A first lower guide member 92 arranged to interplay with the first elongated transmission member 19 may be arranged adjacent to a bottom phase of the section 9*e*. A second upper guide member 92 arranged to interplay with the second elongated transmission member 19 may be arranged adjacent to a top phase of the section 9*e*. A second lower guide member 92 arranged to interplay with the second elongated transmission member 19 may be arranged adjacent to a bottom phase of the section 9*e*.

In one embodiment, the first upper guide member 92 may be arranged coaxially with the first upper guide roller (17) for interplaying with the first elongated transmission member 19 by means of the first elongated transmission member at least partially wrapping around the first upper and lower guide member. The first lower guide member 92 may be arranged coaxially with the first lower guide roller 17 for interplaying with the first elongated transmission member 19. The second upper guide member 92 may be arranged coaxially with the second upper guide roller 17 for interplaying with the second elongated transmission member 19 by means of the second elongated transmission member at least partially wrapping around the second upper and lower guide member. The second lower guide member 92 may be arranged coaxially with the second lower guide roller 17 for interplaying with the second elongated transmission member 19.

As depicted in FIG. 2*a*-*e*, the drive unit 10 may comprise a reduction gearing 76 to provide additional torque between the motor and the driven transmission member 18. The reduction gearing 76 connects the driven transmission member 18 and the motor 11. The reduction gearing may be in the form of a gearbox 76. A gearbox 76 enables selective torque control between for example a high speed mode and a high torque mode of the door operator system.

In one embodiment wherein the drive unit 10 comprises a single motor, the motor is connected to the reduction gearing 76 which may be in the form of the gearbox, whereby an output shaft of the gearbox is connected to the first and second driven transmission member 18 so as to transfer torque to said first and second driven transmission member 18, or in the case of the operator system only having one elongated transmission member, the single driven transmission member.

In one embodiment wherein the drive unit 10 comprises the first and second motor. The first motor may be connected to a first reduction gearing, such as a gearbox, in turn connected to the first driven transmission member. The second motor may be connected to a second reduction gearing, such as a gearbox, in turn connected to the second driven transmission member.

The overhead door operator system may further comprise at least one transmission member protector 61. The transmission member protector 61 is arranged to at least partially enclose the driven transmission member 18 and a portion of the elongated transmission member 19 interplaying with said driven transmission member 19. The transmission member protector 61 is for preventing the elongated transmission member 19 being brought out of engagement with the driven transmission member 18. Hence, a safer overhead door operator system may be achieved. The transmission member protector 61 may also serve as a mean to prevent a human to come into contact with the elongated transmission member 19.

The transmission member protector 61 may be arranged to extend outwardly, i.e. horizontally, from the door 8 across the elongated transmission member 19 to cover said elongated transmission member 19. The transmission member protector 61 may be attached to the door 8 or the drive unit 10.

In one embodiment, in which a plurality of driven transmission members 18 are utilized, the overhead door operator system may comprise a plurality of transmission member protectors 61. Each transmission member protector 61 may be arranged to at least partially enclose a corresponding driven transmission member 18 and the portion of the elongated transmission member 19 interplaying with said driven transmission member 18.

In one embodiment, the overhead door operator system may further a transmission member tensioner for spring-loading the elongated transmission member 19, wherein the top and bottom end of the elongated transmission member 19 are fixedly mounted and the transmission member tensioner is attached to the door 8. The transmission member tensioner may comprise a roller element arranged to interplay with the elongated transmission member 19.

As depicted in FIG. 2*c*, the overhead door operator system may comprise a spring arrangement 74. The spring arrangement 74 is connected to the frame 3, for example the first frame section 4, and the bottom end 68 of the elongated transmission member 19. The elongated transmission member 19 may be routed downwards around a console element 79 disposed adjacent to the floor of the opening and upwards towards the spring arrangement 74.

Figure 2D:
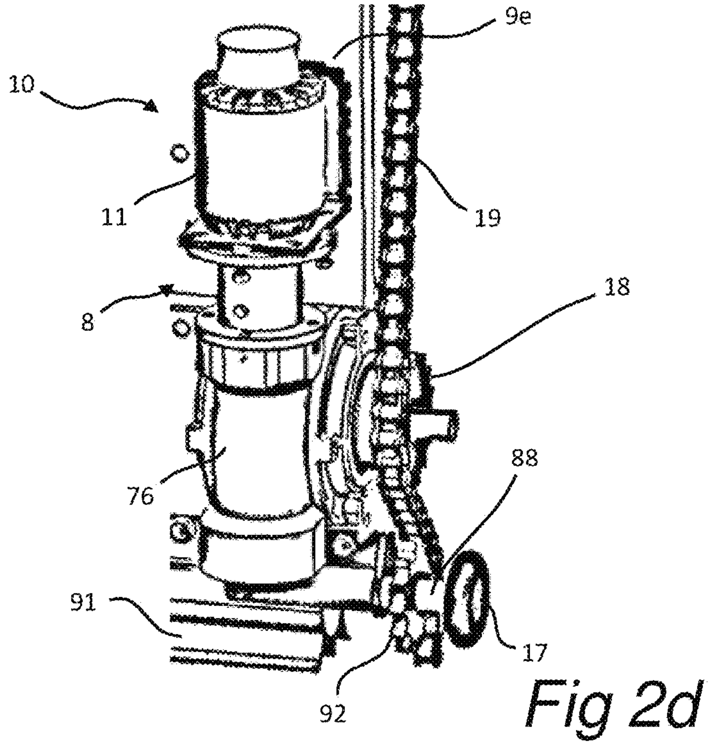
FIG. 2*d* is a schematic perspective view of a drive unit according to an embodiment.
Figure 2E:
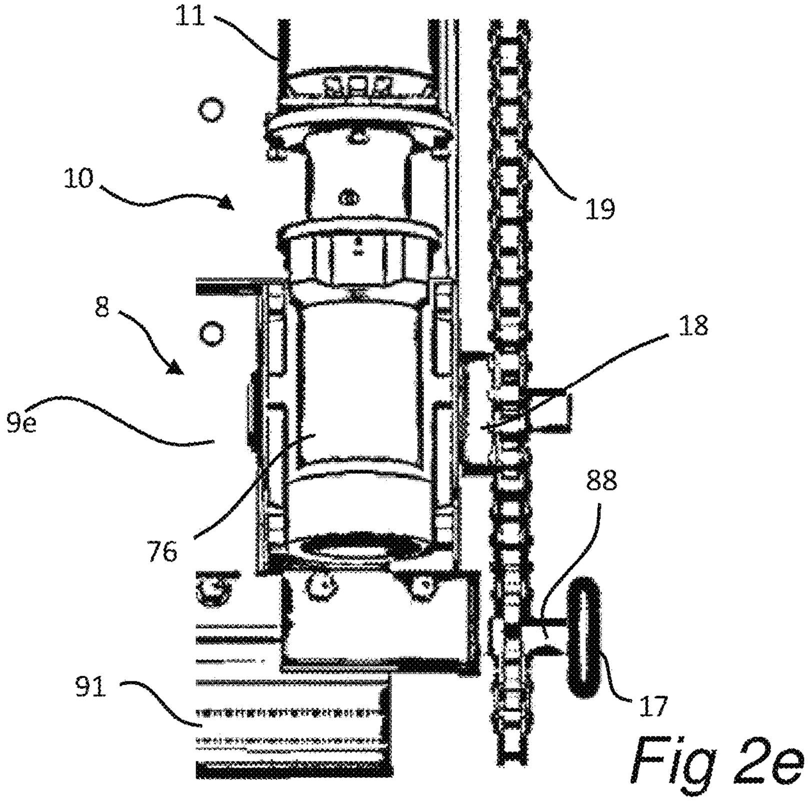
FIG. 2*e* is a schematic perspective view of a drive unit according to an embodiment.
Figure 3:
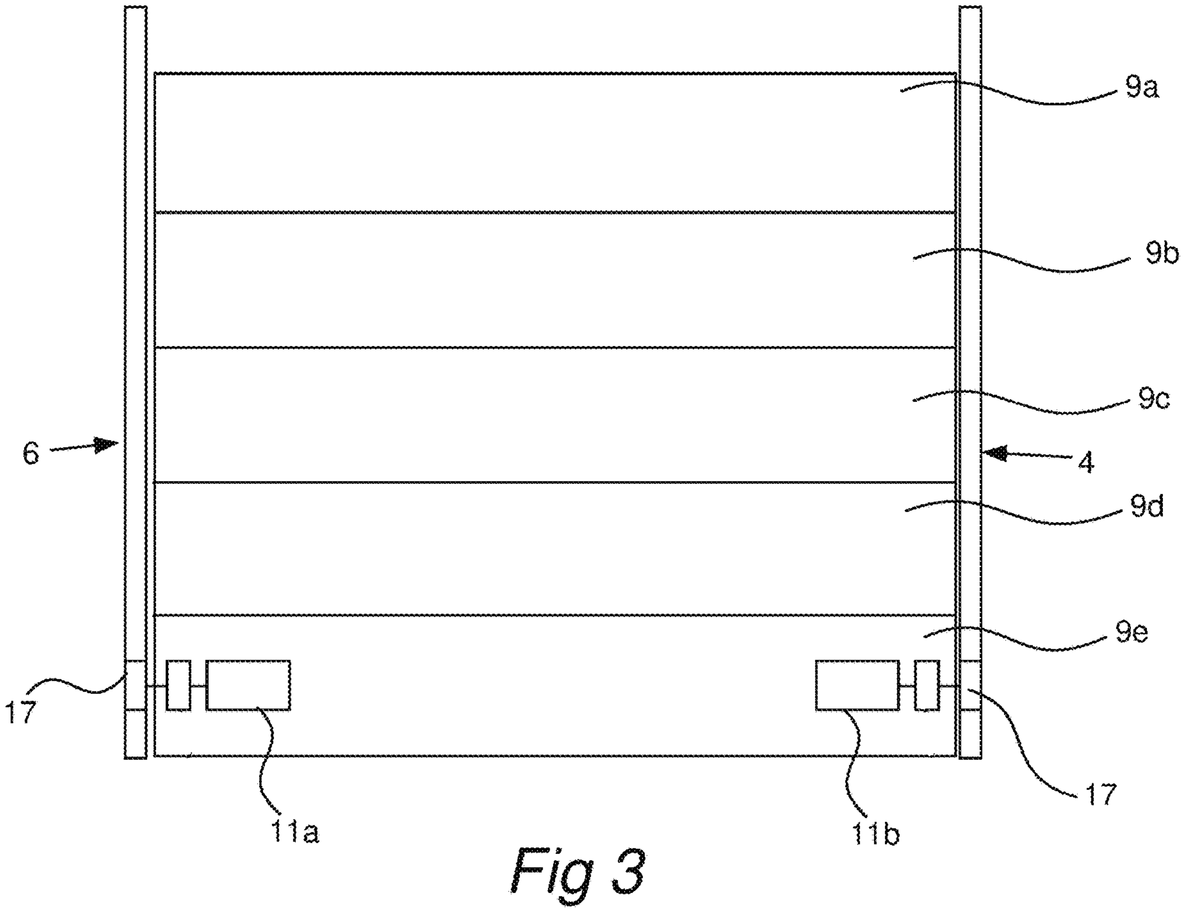
FIG. 3 is a schematic perspective view of a door operator system comprising a door in a closed position.

As seen in FIG. 2*d*-*e*, the overhead door operator system may further comprise a resilient panel 91. The resilient panel 91 is attached to the door 8. The resilient panel 91 extends from the bottom horizontal edge 8 of the door and is further arranged to come into contact with a floor of the opening 2 when the door is in the closed position C. Said resilient panel 91 deforms when coming into contact with the floor upon the door 8 closing, whereby the door 8 is protected from the impact and wear due to coming into direct contact with the floor. Further the resilient panel 91 may provide a sealing effect between the floor and the door when the door is in the closed position. In one embodiment, the resilient panel 91 may be in a rubber material. Turning to FIG. 3, which more closely depicts an overhead door operator system in which the drive unit comprises two motors 11*a*, 11*b*. The first 11*a* and second motor 11*b* may be arranged on the same horizontal section 9*e* of the door 8. The first and second motor may be arranged on the bottommost horizontal section 9*e* of the door 8. The first motor 11*a* and the second motor 11*b* may be mounted at different vertical sides of the door 8, e.g. the first motor 11*a* may be disposed at a vertical side of the door 8 proximal to the first side 5 of the opening and the second motor 11*b* may be disposed at a vertical side of the door 8 proximal to the second side 7 of the opening.

In one embodiment, the drive unit 10 at least comprises a first motor 11*a* and a second motor 11*b*, the first motor 11*a* and the second motor 11_b_ may be mounted at the same vertical sides of the door 8. The first and second motor may be arranged on the same horizontal section of the door 8. The first and second motor may be arranged on the bottommost horizontal section 9_e_ of the door 8.

In one embodiment, the first motor 11_a_ is moveably connected to the first elongated transmission member 19 by means of the first driven transmission member 18 and the second motor 11_b_ is moveably connected to the second elongated transmission member 19 by means of the second driven transmission member 18.

The motors 11 and the drive unit 10 are preferably arranged on the same main phase of the door 8, e.g. an outer or inner phase of the door 8. To protect the motors 11 and drive unit 10, said motors and drive unit are arranged on an inner phase of the door in the form of an interior facing door phase of the door 8.

In one embodiment, the motor(s) 11 of the drive unit 10 is a direct current DC motor 11. In a preferred embodiment, the motor(s) 11 is a brushless direct current (BLDC) motor (s).

A control unit may be in operative communication with the drive unit 10. The control unit may be in wired communication with the two motors 11_a_, 11_b_ or be in a wireless communication.

The control unit is configured to control the movement of the drive unit 10, i.e. when and how the drive unit 10, and its associated motors 11_a_, 11 _b_, should move the door 8. The control unit is arranged to receive input of if the door 8 should be opened or closed. In one embodiment, the control unit is arranged to receive the input from one or more of a user interface, a mechanical button or a remote control. In one embodiment, the control unit is arranged to receive input from sensors for automatic operation of the door.

The drive unit may further comprise additional motors which will now be described further.

Figure 4A:
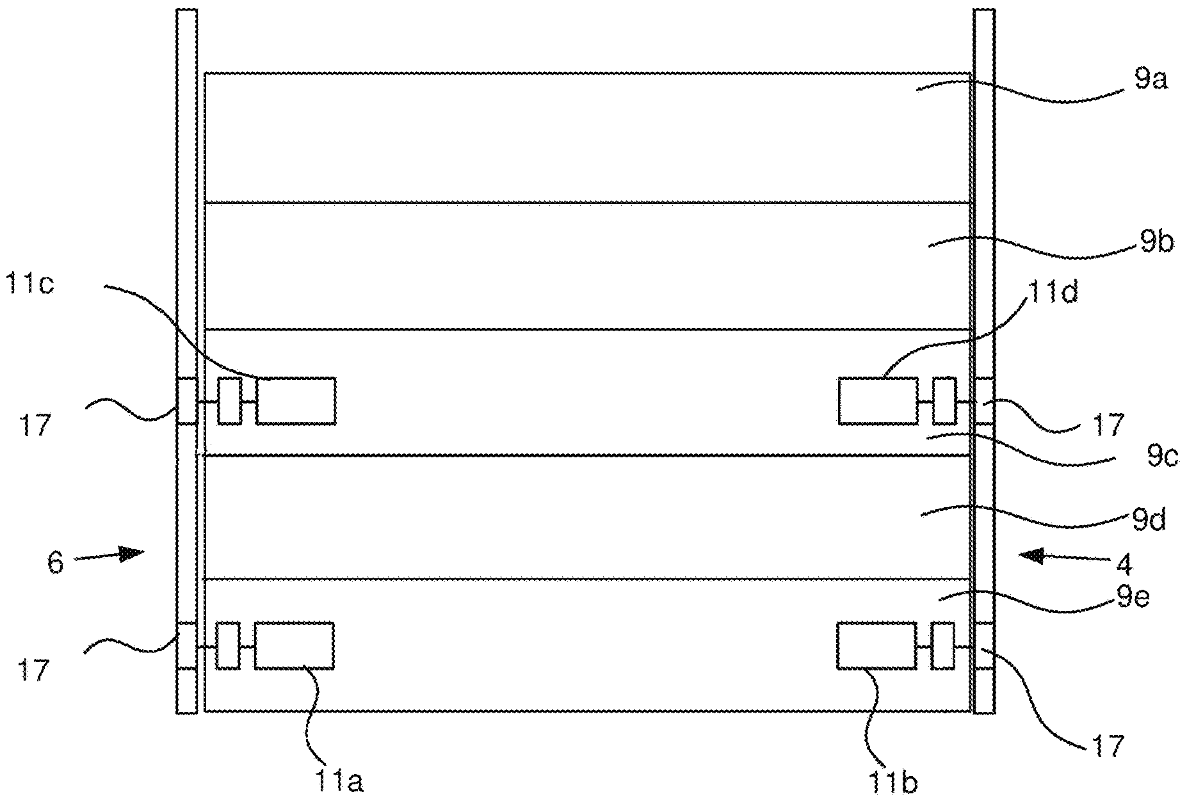
FIG. 4*a* is a schematic perspective view of a door operator system according to an embodiment, the door operator system comprising a door in a closed position.
Figure 4B:
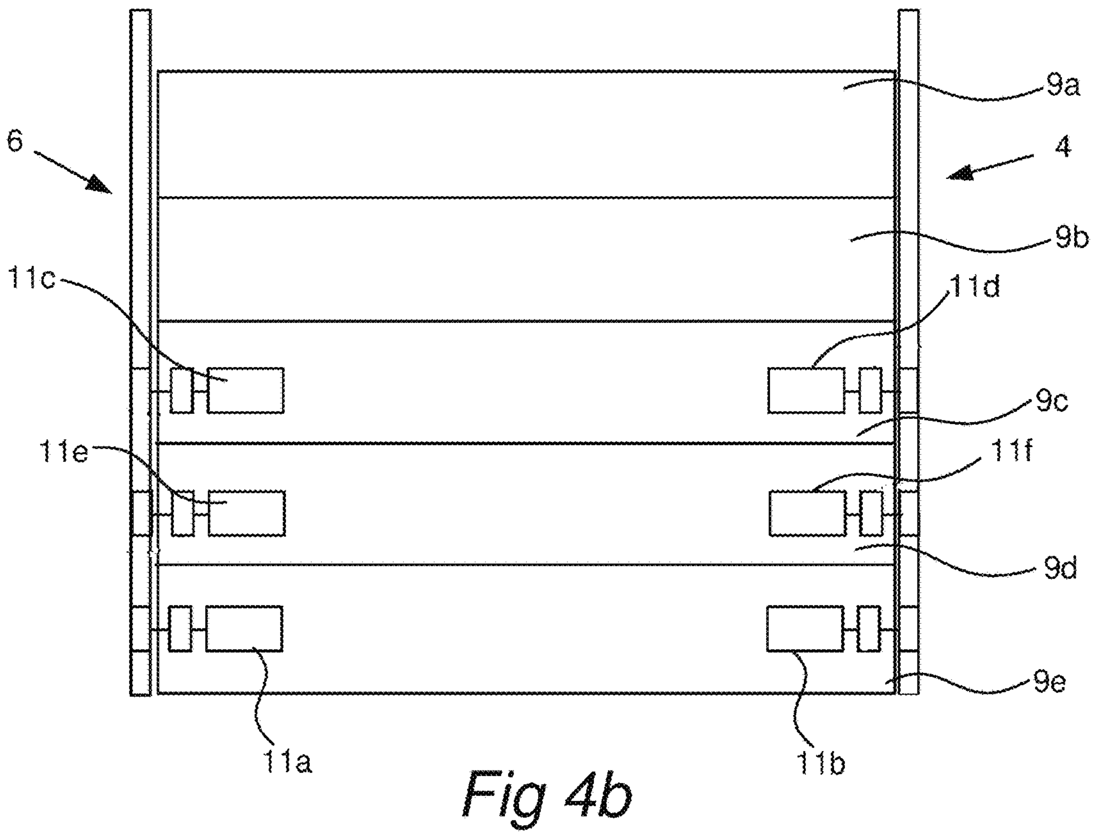
FIG. 4*b* is a schematic perspective view of a door operator system according to an embodiment, the door operator system comprising a door in a closed position.

In one embodiment schematically depicted in FIG. 4_a_, the drive unit 10 comprise a third and a fourth motor 11_c-d_ mounted on a second horizontal section 9 of the horizontal sections and arranged to assist the first and second motors 11_a-b_ when moving the sectional door 8 from the closed position C to the open position O. The third and fourth motors 11 are connected to the control unit 20 and arranged to be controlled by the control unit in the same way as described above in relation to the first and second motor 11. In one embodiment, the system 1 comprises four motors 11_a-d_ and one control unit 20. The first and second motor 11_a_, 11_b_ are arranged on one section 9_e_ and the third and fourth motor 11_c_, 11_d_ are arranged on another section 9_c_. The drive unit 10 may hence comprise a third driven transmission member 18 mounted to the door 8. The third driven transmission member 18 being movably connected to the first elongated transmission member 19 for driving said third driven transmission member 19 along said first elongated transmission member 19. Further, the drive unit may comprise a fourth driven transmission member 18 mounted to the door 8. The fourth driven transmission member 18 being movably connected to the second elongated transmission member 19 for driving said fourth driven transmission member 19 along said second elongated transmission member 19 for driving said fourth driven transmission member 19 along said second elongated transmission member 19. The drive unit may further comprise guide wheels and guide rollers associated with the third and fourth driven transmission member in accordance with what is described with reference to FIG. 2_a-c_.

In one embodiment, the first and second motor 11_a_, 11_b_ are arranged on a section 9_e_ that is located on the section 9 of the door being closest to the floor in the closed position C. However, it should be noted that the section 9_e_ could for example also be the section 9_d_ which is the section being arranged next to the section being closest to the floor in the closed position C.

In one embodiment schematically depicted in FIG. 4_b_, the drive unit 10 comprise a fifth and a sixth motor 11_e-f_ mounted on a third horizontal section 9 of the horizontal sections 9 and arranged to assist the other motors 11 when moving the sectional door 8 from the closed position C to the open position O. The fifth and sixth motors 11_e-f_ are connected to the control unit 20 and arranged to be controlled by the control unit in the same way as described above in relation to the first and second motor 11_a-b_. In one embodiment, the system 1 comprises six motors 11_a-f_ and one control unit. The first and second motor 11_a_, 11 _b_ are arranged on one section 9_e_, the third and fourth motor 11_c_, 11_d_ are arranged on another section 9_c_, and the fifth and sixth motor 11_e_, 11_f_ are arranged on another section 9_d_. The drive unit 10 may hence comprise a fifth driven transmission member 18 mounted to the door 8. The fifth driven transmission member 18 being movably connected to the first elongated transmission member 19 for driving said fifth driven transmission member 19 along said first elongated transmission member 19. Further, the drive unit may comprise a sixth driven transmission member 18 mounted to the door 8. The sixth driven transmission member 18 being movably connected to the second elongated transmission member 19 for driving said sixth driven transmission member 19 along said second elongated transmission member 19 for driving said sixth driven transmission member 19 along said second elongated transmission member 19. The drive unit may further comprise guide wheels and guide rollers associated with the fifth and sixth driven transmission member in accordance with what is described with reference to FIG. 2_a-c_.

In the embodiments where additional sections 9_a-e_ are arranged with motors, these may be arranged on every other section, every section or at one section being arranged above the section 9_e_.

In one embodiment the first, second, third or the first, second, third and fourth motor may be arranged on a section 9. Preferably, said motors may be arranged on the bottommost section 9_e_.

In one embodiment, at least one motor 11 of the drive unit 10 is configured to brake the movement of the door 8 when the door 8 is moved from the open position O to the closed position C. In one embodiment in which the operator system has two motors, both the first and second motor 11_a_ and 11_b_ are configured to brake the movement of the door 8 when the door 8 is moved from the open position O to the closed position C.

In one embodiment, at least one motor 11 of the drive unit 10 is configured to act as a generator and to charge the at least one energy storage device when the door 8 is moved from the open position O to the closed position C. In one embodiment, both the first and second motor 11_a_, 11_b_ of the drive unit 10 is configured to act as a generator and to charge the at least one energy storage device when the door 8 is moved from the open position O to the closed position C. Due to the weight of the door 8 forcing the door towards the closed position, the at least one motor of the drive unit is caused to rotate, whereby the motor may generate power for charging said energy storage device.

At least one motor 11 of the drive unit 10 may further comprise a brake. In one embodiment, both the first 11*a* and the second motor 11*b* comprises the brake. In one embodiment, the brake is an electromagnetic brake. The brake is arranged to control/reduce the speed of the door 8 when it is moved from the open position O to the closed position C. In one embodiment, the brake is arranged to keep the door from moving in any position along the trajectory of door between the closed position and open position.

In one embodiment, the drive unit 10 is mounted to a section 9*e*, i.e. one of said plurality of horizontal and interconnected sections, of the door 8. The first motor 11*a* and the second motor 11*b* are arranged on the same section 9*e*. Preferably, the first motor 11*a* and the second motor 11*b* are arranged at different vertical sides of the section 9*e*. Each motor 11*a*, 11*b* is thus arranged in conjunction to the first frame section 4 and the second frame section 6, respectively.

In one embodiment, the door 8 could be horizontal, or at least at an angle in view of the closed position C, and the door 8 is positioned inside of the opening 2 and above the opening 2. When moving from the closed position C to the open position O, the sections 9 of the door that are interconnected will push on each other such that the whole door 8 will move upwards. The sections 9 will rotate and move in relation to each other when moving from a vertical position to the horizontal position.

In one embodiment, at least one of the first and second motor 11 is run as a generator 11 when moving the door 8 from the open position O to the closed position C. As the sprocket(s) 18 are rotated the generator 11 is rotated. The generator 11 reduces the speed of the door 8. The generator 11 that is connected to the energy storage device charges said energy storage device when moved. By using the kinetic energy of the moving door 8 the energy storage device is charged.

The invention has been described above in detail with reference to embodiments thereof. However, as is readily understood by those skilled in the art, other embodiments are equally possible within the scope of the present invention, as defined by the appended claims. It is recalled that the invention may generally be applied in or to an entrance system having one or more moveable door member not limited to any specific type. The or each such door member may, for instance, be a swing door member, a revolving door member, a sliding door member, an overhead sectional door member, a horizontal folding door member or a pull-up (vertical lifting) door member.

The invention claimed is:

1. An overhead door operator system, comprising:

a door frame adjacent an opening comprising a first frame section at a first side of the opening and a second frame section at a second side of the opening;

a door arranged to be moved between an open (O) and closed (C) position, the door being movably connected to the door frame;

a drive unit mounted on the door, the drive unit comprising at least one motor arranged to move the door from the closed position (C) to the open position, and an elongated transmission member extending along the first side of the opening and the first frame section, whereby the drive unit further comprises a driven transmission member in driving connection with the at least one motor, the driven transmission member being movably connected to the elongated transmission member and arranged to interplay with said elongated transmission member for driving the driven transmission member along said elongated transmission member by means of the elongated transmission member at least partially wrapping around the driven transmission member;

at least one guide member mounted to the door arranged to interplay with the elongated transmission member for guiding the door along the elongated transmission member by means of the elongated transmission member at least partially wrapping around the at least one guide member; and a first set of guide rollers mounted to the door arranged to interplay with the first frame section and a second set of guide rollers arranged to interplay with the second frame section, wherein the at least one guide member is arranged coaxially with one of the guide rollers, wherein a top end of the elongated transmission member is fixedly mounted to the frame and a bottom portion of the elongated transmission member engages a console at a fixed position proximal to a floor of the opening, wherein the bottom portion extends around the console and upward, and wherein the bottom portion is connected to a connection point on the frame by a biasing member, wherein the console and the connection point are fixed with respect to one another on the frame, wherein the biasing member comprises a spring arrangement connected at one end with the bottom end of the elongated transmission member and extending upwardly and connected at another end with the connection point on the frame.

2. The overhead door operator system according to claim 1, wherein the elongated transmission member is in the form of a suspended bendable transmission member.

3. The overhead door operator system according to claim 1, wherein the biasing member is spring-loaded.

4. The overhead door operator system according to claim 1, whereby the drive unit further comprises a reduction gearing, said reduction gearing connecting the driven transmission member and the at least one motor.

5. The overhead door operator system according to claim 1, further comprising a resilient panel attached to the door and extending from a bottom horizontal edge of the door, said resilient panel being arranged to come into contact with a floor of the opening when the door is in the closed position (C).

6. The overhead door operator system according to claim 1, wherein the elongated transmission member is a belt.

7. The overhead door operator system according to claim 6, wherein the belt is cogged.

8. The overhead door operator system according to claim 1, wherein the elongated transmission member is a chain.

9. The overhead door operator system according to claim 8, wherein the at least one guide member is a cogged wheel.

10. The overhead door operator system according to claim 1, wherein the door comprises a plurality of horizontal and interconnected sections.

11. The overhead door operator system according to claim 10, wherein the drive unit is mounted on a section of the door wherein the first and second sets of guide rollers each comprise an upper guide roller and a lower guide roller, wherein the upper and lower guide rollers of the first set extend towards the first frame section, and wherein the upper and lower guide rollers of the second set extend toward the second frame section.

12. The overhead door operator system according to claim 11, wherein the drive unit is mounted to a bottommost section of the door and the first and second lower guide rollers are disposed adjacent to a bottom horizontal end phase of the bottommost section.

13. The overhead door operator system according to claim 12, wherein the upper guide rollers are disposed adjacent to a top horizontal end phase of the bottommost section.

14. The overhead door operator system according to claim 13, wherein each of the at least one guide members are arranged coaxially with a respective one of the guide rollers.

15. The overhead door operator system according to claim 14, wherein the at least one guide member comprises a first upper guide member arranged coaxially with the first upper guide roller and a first lower guide member arranged coaxially with the first lower guide roller.

16. The overhead door operator system according to claim 15, wherein the elongated transmission member comprises a first elongated transmission member extending along the first side of the opening and the first frame section and a second elongated transmission member extending along the second side of the opening and the second frame section, wherein the driven transmission member comprises first and second driven transmission members arranged to interplay with the first and second elongated transmission members by means of the first and second elongated transmission members at least partially wrapping around the first and second driven transmission members, respectively.

17. The overhead door operator system according to claim 16, further comprising at least one guide member mounted to the door arranged to interplay with the second elongated transmission member for guiding the door along the second elongated transmission member.

18. The overhead door operator system according to claim 17, further comprising a second upper guide member arranged coaxially with the second upper guide roller and a second lower guide member arranged coaxially with the second lower guide roller, wherein the first driven transmission member is arranged between the first upper and lower guide members and the second driven transmission member is arranged between the second upper and lower guide members.

19. The overhead door operator system according to claim 16, wherein the at least one motor comprises a first motor and a second motor being in driving connection with the first and second driven transmission members, respectively.

20. The overhead door operator system according to claim 19, wherein the drive unit further comprises a first reduction gearing connecting the first drive transmission member and the first motor and a second reduction gearing connecting the second driven transmission member and the second motor.

21. The overhead door operator system according to claim 16, wherein the at least one motor is in driving connection with the first and second driven transmission members.

22. The overhead door operator system according to claim 14, wherein one of the guide rollers and one of the at least one guide members are arranged coaxially to each other adjacent to a bottom horizontal edge of the door.

* * * * *